US012583439B2

(12) United States Patent
Blue et al.

(10) Patent No.: US 12,583,439 B2
(45) Date of Patent: Mar. 24, 2026

(54) SYSTEMS AND METHODS FOR PREDICTING A DISCONNECT CLUTCH TIME TO CONNECTION

(71) Applicant: Ford Global Technologies, LLC, Dearborn, MI (US)

(72) Inventors: Corey James Blue, Belleville, MI (US); Samuel Melville Glauber, McLean, VA (US); Sassan Farahmand, Canton, MI (US); Fazal Urrahman Syed, Canton, MI (US); Timothy Baxendale, Portales, NM (US); Zachary John Sinisi, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 143 days.

(21) Appl. No.: 18/635,466

(22) Filed: Apr. 15, 2024

(65) Prior Publication Data

US 2025/0319860 A1     Oct. 16, 2025

(51) Int. Cl.
| | |
|---|---|
| *B60W 20/40* | (2016.01) |
| *B60W 10/02* | (2006.01) |
| *B60W 10/06* | (2006.01) |
| *B60W 10/08* | (2006.01) |

(52) U.S. Cl.
CPC ............ *B60W 20/40* (2013.01); *B60W 10/02* (2013.01); *B60W 10/06* (2013.01); *B60W*

10/08 (2013.01); *B60W 2510/0638* (2013.01); *B60W 2710/06* (2013.01); *B60W 2710/083* (2013.01)

(58) Field of Classification Search
CPC ...... B60W 20/40; B60W 10/02; B60W 10/06; B60W 10/08; B60W 2510/0638; B60W 2710/06; B60W 2710/083
See application file for complete search history.

(56) References Cited

U.S. PATENT DOCUMENTS

| | | | |
|---|---|---|---|
| 9,493,152 B2 | 11/2016 | Doering et al. | |
| 9,969,383 B2 | 5/2018 | Gibson et al. | |
| 10,704,618 B2 | 7/2020 | Johri et al. | |
| 2012/0323418 A1 | 12/2012 | Sah et al. | |
| 2014/0018207 A1* | 1/2014 | Kobayashi ............ | B60W 20/10 903/902 |
| 2021/0061258 A1* | 3/2021 | Saito ..................... | B60W 20/19 |

FOREIGN PATENT DOCUMENTS

| | | | | |
|---|---|---|---|---|
| JP | 2003205768 A | * | 7/2003 | ............ B60K 41/02 |

* cited by examiner

*Primary Examiner* — Tisha D Lewis
(74) *Attorney, Agent, or Firm* — Burris Law, PLLC

(57) ABSTRACT

A method including the determination of a predicted time associated with a completion of an engine-start, the causation of an engine to transition into torque control in response to a difference between a calibration-time period associated with the predicted time and a time-to-connection associated with an engine-start time period, the causation of a disconnect clutch to lock in response to the calibration-time period being within a range of the time-to-connection associated with the engine-start time period, and the transmission of a report that the disconnect clutch is locked.

20 Claims, 4 Drawing Sheets

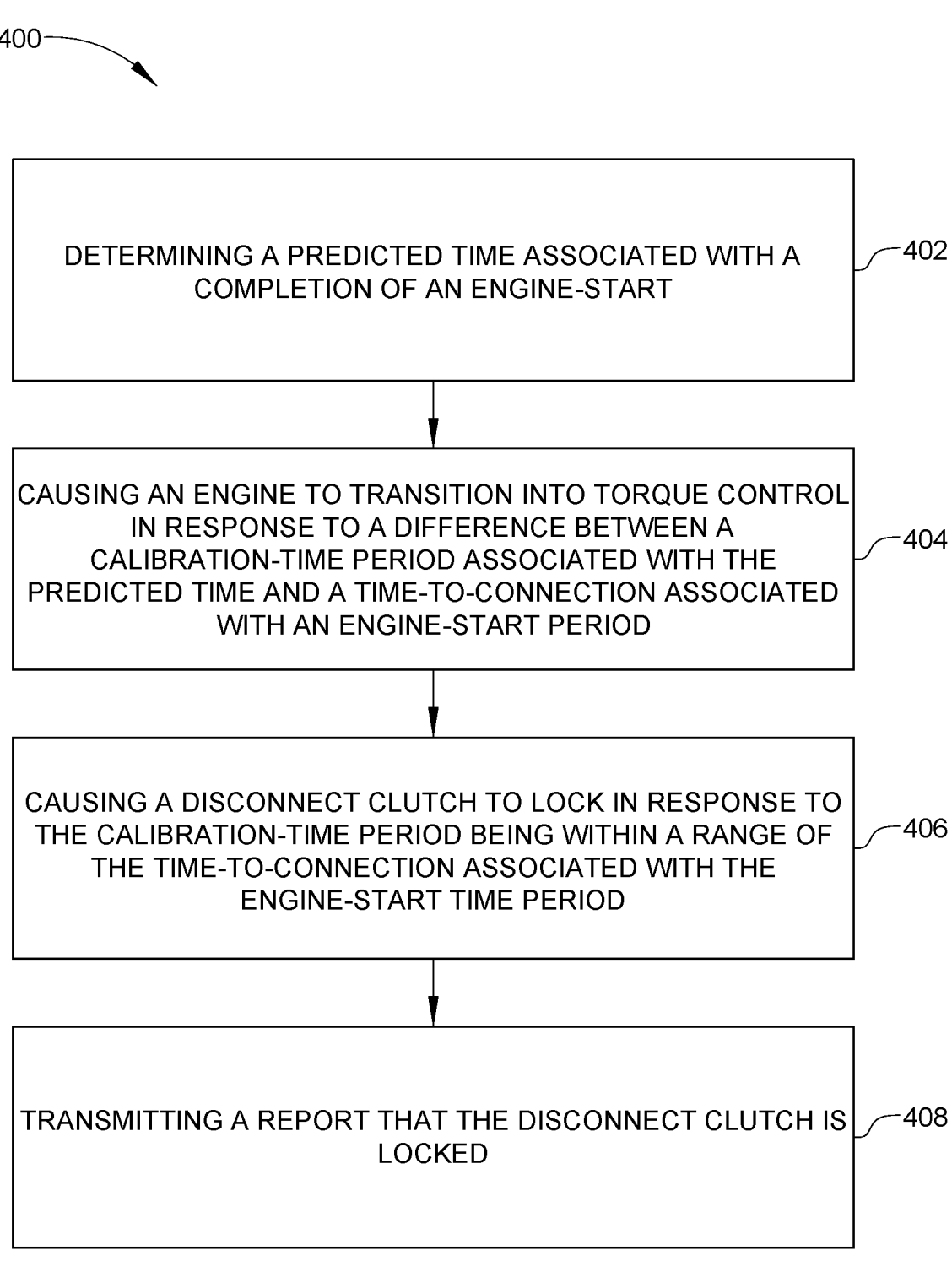

400

DETERMINING A PREDICTED TIME ASSOCIATED WITH A COMPLETION OF AN ENGINE-START — 402

CAUSING AN ENGINE TO TRANSITION INTO TORQUE CONTROL IN RESPONSE TO A DIFFERENCE BETWEEN A CALIBRATION-TIME PERIOD ASSOCIATED WITH THE PREDICTED TIME AND A TIME-TO-CONNECTION ASSOCIATED WITH AN ENGINE-START PERIOD — 404

CAUSING A DISCONNECT CLUTCH TO LOCK IN RESPONSE TO THE CALIBRATION-TIME PERIOD BEING WITHIN A RANGE OF THE TIME-TO-CONNECTION ASSOCIATED WITH THE ENGINE-START TIME PERIOD — 406

TRANSMITTING A REPORT THAT THE DISCONNECT CLUTCH IS LOCKED — 408

FIG. 4

SYSTEMS AND METHODS FOR PREDICTING A DISCONNECT CLUTCH TIME TO CONNECTION

FIELD

The present disclosure relates to a locking process associated with a disconnect clutch. More specifically, the present disclosure controls the timing of when the disconnect clutch engages an engine associated with a vehicle.

BACKGROUND

The statements in this section merely provide background information related to the present disclosure and may not constitute prior art.

During an engine start and connect process, disconnect clutch torque capacity is typically controlled to crank and/or connect the engine with a modulated pressure and/or a capacity profile. Based on drivability and responsiveness requirements associated with a vehicle, systems attempt to accurately and precisely control disconnect capacity delivery and estimation for coordination between the disconnect clutch and a motor. However, communication delays between the disconnect clutch and the motor can affect a reporting of when the disconnect clutch is locked, which can cause operating inefficiencies in the vehicle.

The present disclosure addresses these and other issues related to managing the timing of the engagement of the disconnect clutch with the engine.

SUMMARY

This section provides a general summary of the disclosure and is not a comprehensive disclosure of its full scope or all of its features.

The present disclosure provides a method comprising: determining a predicted time associated with a completion of an engine-start based on a request to initiate the engine-start; causing an engine to transition into torque control in response to a difference between a calibration-time period associated with the predicted time and a time-to-connection associated with an engine-start time period; causing a disconnect clutch to lock in response to the calibration-time period being within a range of the time-to-connection associated with the engine-start time period; and transmitting a report that the disconnect clutch is locked; further comprising: transmitting a step-out motor torque request based on the difference between the calibration-time period and the time-to-connection associated with the engine-start time period, wherein the transmission of the step-out motor request is further based on one or more errors, wherein the one or more errors include the time-to-connection associated with the engine-start time period falling below the calibration-time period, a communication delay, a controller area network delay, a response delay, or a combination thereof; wherein causing the disconnect clutch to lock is based on the calibration-time period being concurrent with the time-to-connection associated with the engine-start time period; further comprising: determining the difference between the calibration-time period and the time-to-connection associated with the engine-start time period based on one or more errors, wherein the one or more errors include the time-to-connection associated with the engine-start time period being outside of the calibration-time period, a communication delay, a controller area network delay, a response delay, or a combination thereof; wherein determining the predicted time associated with the completion of the engine-start further comprises: determining a slip rate based on an impeller speed and an engine speed; or determining a slip rate based on an impeller speed and a target engine speed; wherein the determination of the predicted time is further based on dividing the slip rate by a derivative of the slip rate; and further comprising: applying one or more condition-based variables to the impeller speed or the engine speed based on one or more historic slip rates, wherein the one or more condition-based variables include a filter variable, an offset variable, one or more input parameters, or a combination thereof.

The present disclosure provides a system comprising: a vehicle controller configured to: determine a predicted time associated with a completion of an engine-start based on a request to initiate the engine-start; cause an engine to transition into torque control in response to a difference between a calibration-time period associated with the predicted time and a time-to-connection associated with an engine-start time period; cause a disconnect clutch to lock in response to the calibration-time period being within a range of the time-to-connection associated with the engine-start time period; and transmit a report that the disconnect clutch is locked; wherein the vehicle controller is further configured to: transmit a step-out motor torque request based on the difference between the calibration-time period and the time-to-connection associated with the engine-start time period, wherein the transmission of the step-out motor request is further based on one or more errors, wherein the one or more errors include the time-to-connection associated with the engine-start time period falling below the calibration-time period, a communication delay, a controller area network delay, a response delay, or a combination thereof; wherein causing the disconnect clutch to lock is based on the calibration-time period being concurrent with the time-to-connection associated with the engine-start time period; wherein the vehicle controller is further configured to: determine the difference between the calibration-time period and the time-to-connection associated with the engine-start time period based on one or more errors, wherein the one or more errors include the time-to-connection associated with the engine-start time period being outside of the calibration-time period, a communication delay, a controller area network delay, a response delay, or a combination thereof; wherein the vehicle controller configured to determine the predicted time associated with the completion of the engine-start is further configured to: determine a slip rate based on an impeller speed and an engine speed; or determine a slip rate based on an impeller speed and a target engine speed; wherein the determination of the predicted time is further based on dividing the slip rate by a derivative of the slip rate; and wherein the vehicle controller is further configured to: apply one or more condition-based variables to the impeller speed or the engine speed based on one or more historic slip rates, wherein the one or more condition-based variables include a filter variable, an offset variable, one or more input parameters, or a combination thereof.

The present disclosure provides one or more non-transitory computer-readable media storing processor-executable instructions that, when executed by at least one processor, cause the at least one processor to: determine a predicted time associated with a completion of an engine-start based on a request to initiate the engine-start; cause an engine to transition into torque control in response to a difference between a calibration-time period associated with the predicted time and a time-to-connection associated with an engine-start time period; cause a disconnect clutch to lock in response to the calibration-time period being within a range of the time-to-connection associated with the engine-start time period, wherein causing the disconnect clutch to lock is based on the calibration-time period being concurrent with the time-to-connection associated with the engine-start time period; and transmit a report that the disconnect clutch is locked; wherein the at least one processor is further caused to: transmit a step-out motor torque request based on the difference between the calibration-time period and the time-to-connection associated with the engine-start time period, wherein the transmission of the step-out motor request is further based on one or more errors, wherein the one or more errors include the time-to-connection associated with the engine-start time period falling below the calibration-time period, a communication delay, a controller area network delay, a response delay, or a combination thereof; wherein the at least one processor is further caused to: determine the difference between the calibration-time period and the time-to-connection associated with the engine-start time period based on one or more errors, wherein the one or more errors include the time-to-connection associated with the engine-start time period being outside of the calibration-time period, a communication delay, a controller area network delay, a response delay, or a combination thereof; wherein the at least one processor is further caused to: determine a slip rate based on an impeller speed and an engine speed; or determine a slip rate based on an impeller speed and a target engine speed; wherein the determination of the predicted time is further based on dividing the slip rate by a derivative of the slip rate; and wherein the at least one processor is further caused to: apply one or more condition-based variables to the impeller speed or the engine speed based on one or more historic slip rates, wherein the one or more condition-based variables include a filter variable, an offset variable, one or more input parameters, or a combination thereof.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 4 is a flowchart illustrating an example method for managing the timing of the engagement of the disconnect clutch with the engine in accordance with various implementations.

Figure 1:
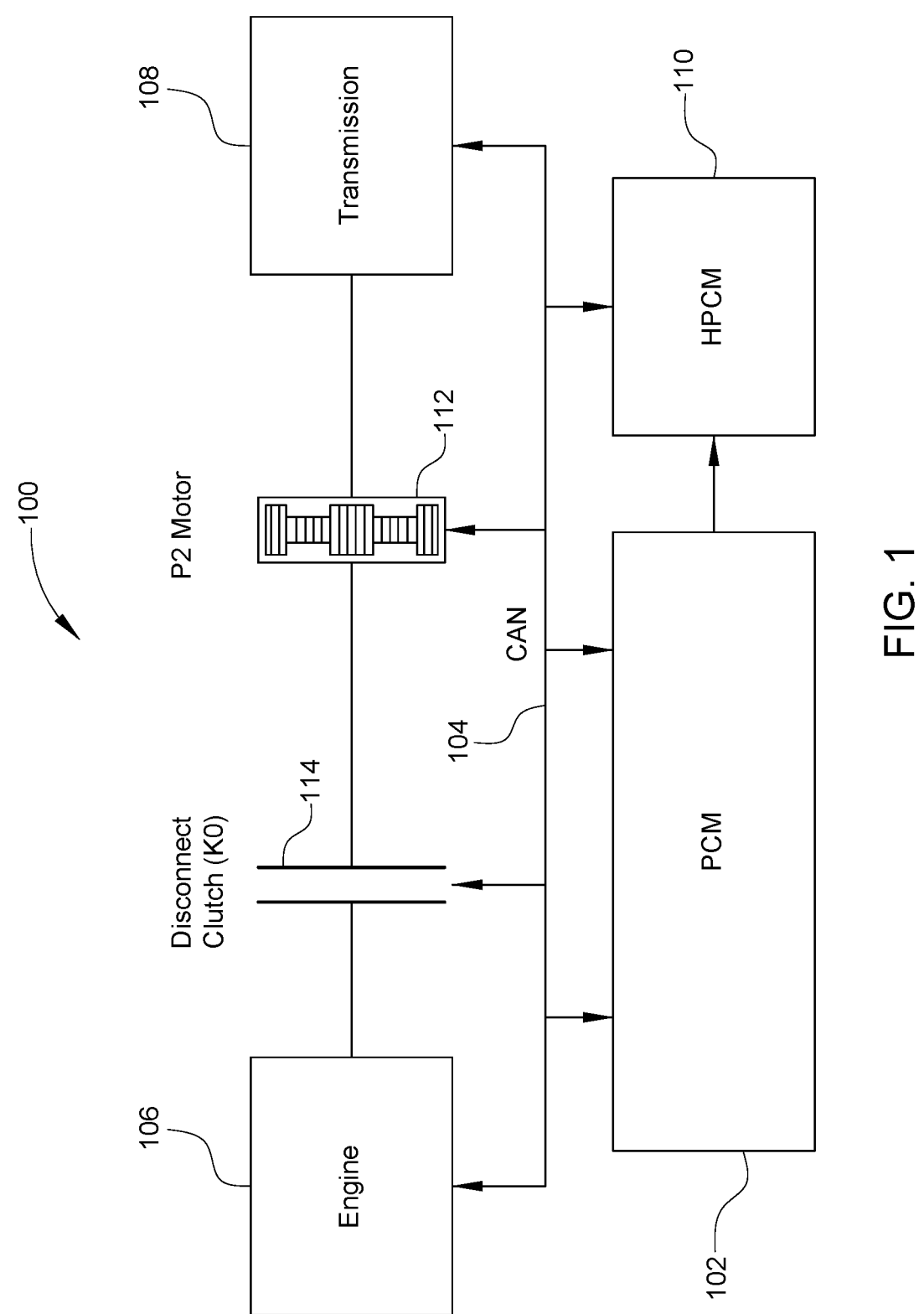
FIG. 1 illustrates an operating system for a hybrid-electric vehicle in accordance with various implementations.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a means for determining a leading prediction of when an engine is going to intersect with an impeller speed during an engine start to mitigate communication delays in an operating system associated with a vehicle. The present disclosure also provides for the enhancement of accuracy associated with reporting the actual time when a disconnect clutch engages the engine associated with the vehicle.

In one or more examples, such an enhancement mitigates the disconnect clutch's engagement with the engine from being reported as locked too quickly (e.g., not necessarily earlier than it should be reported), which can cause a motor torque to blend out too early, thereby creating a negative pull-down in impeller speed and resulting in poor drivability of the vehicle. Additionally, the reporting of the lock too quickly can also cause the engine to be transitioned into torque control too soon, thereby resulting in a slipping condition that can damage the disconnect clutch hardware.

In some examples, such an enhancement also mitigates the disconnect clutch's engagement with the engine from being reported as locked too slowly (e.g., not necessarily later than it should be reported), which can cause the motor torque to compensate for the disconnect clutch after the engine is at impeller speed, thereby resulting in a surge or positive increase in impeller speed, which causes poor drivability. Additionally, the disconnect clutch's engagement with the engine from being reported as locked too slowly can also cause the engine to be transitioned into torque control too slowly, which increases a response delay, thereby resulting in poor drivability.

Therefore, proper and accurate management of the timing of the disconnect clutch's engagement with the engine provides for an enhancement in performance associated with the vehicle. More specifically, such an enhancement provides for the motor controls and engine controls to operate in different modules and have different response delays that can each require different locked report timing so that acceptable drivability may be offered to an operator of the vehicle.

FIG. 1 shows a schematic block diagram illustration of a hybrid operating system 100. The hybrid operating system 100, in one or more examples, may be integrated within a hybrid-electric vehicle (not shown) to provide propulsion support for the hybrid-electric vehicle. It is understood, for example, that the hybrid operating system 100 may be integrated within any type of hybrid-related vehicle such as a mild hybrid-electric vehicle, a plug-in hybrid-electric vehicle, and/or a fully hybrid-electric vehicle.

The hybrid operating system 100 generally includes a powertrain control module (PCM) 102, a controller area network (CAN) bus 104, an engine module 106, a transmission module 108, a hybrid powertrain control module (HPCM) 110, a parallel type 2 (P2) motor 112, and a disconnect clutch 114.

The PCM 102 operates as the central processing unit of the hybrid operating system 100 and facilitates the distribution of one or more operating instructions to each of the other components (e.g., the CAN bus 104, the engine module 106, the transmission module 108, the HPCM 110, the P2 motor 112, and the disconnect clutch 114) of the hybrid operating system 100. As an example, the PCM 102 is configured to monitor and/or control the functionality of each of the other components.

For example, the PCM 102 is configured to send the one or more operating instructions to each of the other components of the hybrid operating system 100 via the CAN bus 104. As yet another example, the PCM 102 is configured to send the one or more operating instructions based on the monitored and/or controlled functionality of each of the other components. As another example, the CAN bus 104 can receive each of the one or more instructions from the PCM 102 and prioritize the one or more operating instructions to mitigate any overloading of any of the other components of the hybrid operating system 100. As a further example, the priority of each of the one or more operating instructions also causes the one or more operating instructions to be received by each of the other components in a correct order for the successful completion of one or more tasks. As yet another example, the PCM 102 is configured to alert an operator of the hybrid-electric vehicle of any issues with any of the other components. For example, the alert may be a check engine light or any other type of indication of the issue(s).

As a specific example, the PCM 102 is also configured to control and/or manage performance associated with the engine module 106. For example, the PCM 102 is configured to monitor and/or adjust (e.g., via the one or more operating instructions) various functions associated with the engine module 106 such as, but not limited to, ignition timing, fuel injection, emission control(s), or a combination thereof. As a further example, the PCM 102 controls, manages, monitors, and/or adjusts (e.g., the one or more operating instructions) the engine module 106 based on one more sensors (not shown) associated with the engine module 106. The one or more sensors associated with the engine module 106 can include oxygen sensor(s), battery voltage sensor(s), coolant temperature sensor(s), or throttle position sensor(s), for example. However, it is understood that the one or more sensors associated with the engine module 106 can include any other sensors associated with the hybrid operating system 100 and/or the general operation of the hybrid-electric vehicle. As an additional example, the PCM 102 is further configured to diagnose and/or report any issues (e.g., malfunctions) with the engine module 106. For example, the issues can include overheating associated with the engine module 106, one or more misfires associated with the engine module 106, low oil pressure associated with the engine module 106, or a combination thereof. However, it is understood that the issues can be any malfunction or issue related to the operation of the engine module 106. As an example, the report can include an alert to the operator of the hybrid-electric vehicle and/or an infrastructure system.

As another specific example, the PCM 102 is further configured to control and/or manage performance associated with the transmission module 108. For example, the PCM 102 is configured to monitor and/or adjust (e.g., via the one or more operating instructions) various functions associated with the transmission module 108, such as, but not limited to, determining a time for successful automatic transition of a current gear to another gear associated with the hybrid-electric vehicle. As a further example, the PCM 102 controls, manages, monitors, and/or adjusts (e.g., via the one or more operating instructions) the transmission module 108 based on one or more sensors (not shown) associated with the transmission module 108. For example, the one or more sensors associated with the transmission module 108 provide data related to throttle position, vehicle speed, revolutions per minute, or a combination thereof. However, it is understood that the one or more sensors associated with the transmission module 108 can include any other sensors associated with the hybrid operating system 100 and/or the general operation of the hybrid-electric vehicle. As another example, the determination of the time for successful automatic transition of the current gear to the another gear associated with the hybrid-electric vehicle is based on the data provided by the one or more sensors associated with the transmission module 108.

The HPCM 110 is configured to supplement the functionality of the PCM 102 by providing additional information regarding the hybrid functionality of the hybrid-electric vehicle. As an example, the HPCM 110 can be configured to forward the one or more operating instructions originating from the PCM 102 to the P2 motor 112. However, it is also understood that the one or more operating instructions may also originate from the HPCM 110 as well. In one or more embodiments, the P2 motor 112 is disposed between the engine module 106 and the transmission module 106. However, it is understood that the P2 motor 112 may be disposed anywhere within the hybrid operating system 100. As an example, the P2 motor 112 is configured to enable solely electric driving by disengaging the engine module 106, via the disconnect clutch 114.

For example, based on the one or more operating instructions, the P2 motor 112 can cause the disconnect clutch 114 to disengage with the engine module 106 in an instance wherein an electric motor driving mode is activated. As another example, the P2 motor 112 can also cause the disconnect clutch 114 to engage or re-engage with the engine module 106 in an instance wherein the one or more operating instructions include a command signal indicative of an initiation of a hybrid driving mode.

Figure 2:
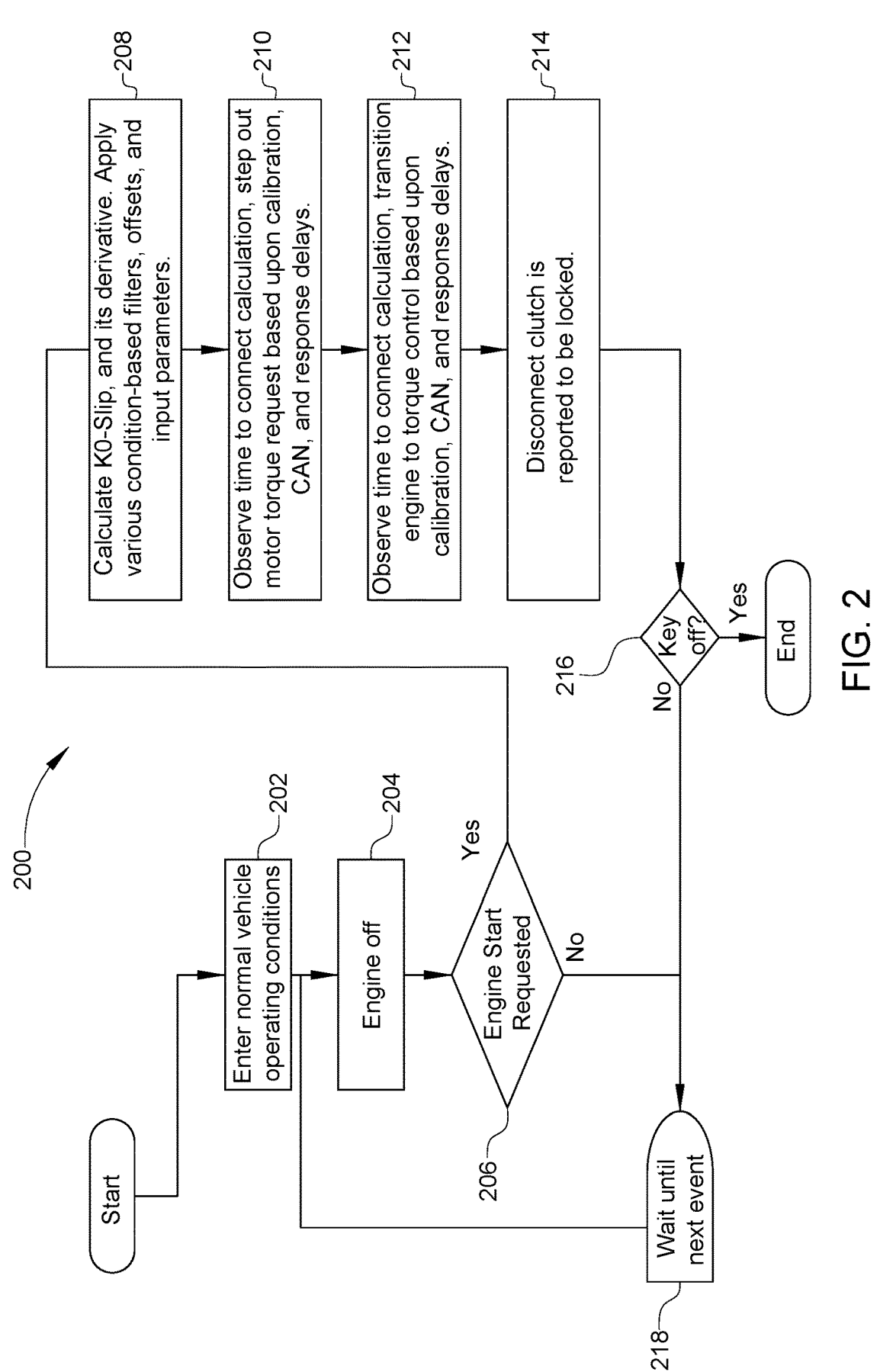
FIG. 2 is a flowchart illustrating an example method for managing a timing of engagement of a disconnect clutch with an engine in accordance with various implementations.

FIG. 2 is a flowchart illustrating an example method 200 for controlling a locking time of the disconnect clutch 114 associated with the hybrid-electric vehicle, such as to optimize when the locking occurs. At operation 202, the hybrid-electric vehicle can enter normal operation conditions. At operation 204, the hybrid-electric vehicle is operating in a fully electric manner (e.g., not utilizing the engine module 106). In an instance wherein a request to start the engine module 106 is received (e.g., at operation 206), a theoretical time to connection (e.g., a time for the disconnect clutch 114 to engage with the engine module 106) is calculated at operation 208. In one or more embodiments, the theoretical time to connection is determined by calculating the quotient of a disconnect (K0) clutch-slip and a derivative of the disconnect clutch-slip, as follows:

$$\text{Time to Connection}_{sec} = K0 \text{ Slip}/K0 \text{ Slip Derivative}$$

For example, the disconnect clutch-slip is calculated at operation 208. Additionally, at operation 208, a derivative of the disconnect clutch-slip is also calculated. For example, the disconnect clutch-slip is determined by calculating the difference between an impeller speed (e.g., associated with the P2 motor 112) and an engine speed (e.g., associated with the engine module 106), as follows:

$$K0 \text{ Slip}_{rev/sec} = \text{Impeller Speed} - \text{Engine Speed}$$

It is understood that the disconnect clutch-slip can be determined by calculating the difference between the engine speed and the impeller speed as well. It is further understood that while the disconnect clutch-slip is calculated based on revolutions (rev) per second (sec) above, the disconnect clutch-slip may also be calculated based on any other unit of measurement. As an example, the disconnect clutch-slip can also be calculated based on a target engine speed (e.g., of the engine module 106) and/or a target motor speed (e.g., of the P2 motor 112).

Additionally, various filters and/or offsets can be applied to the impeller speed and/or the engine speed. For example, the various filters and/or offsets are applied to the impeller speed and/or the engine speed based on historical times to connection (e.g., a time for the disconnect clutch 114 to engage the with the engine module 106). As another example, the various filters and/or offsets are utilized in the calculation of the disconnect clutch-slip, to ensure that the disconnect clutch-slip is likely similar to an actual slip rate based on the historical times to connection. As another example, the various filters and/or offsets are utilized in the calculation of disconnect clutch-slip based on a slip rate associated with the hybrid-electric vehicle and/or other variables such as temperature of components of the hybrid operating system 100, input parameters associated with the engine module 106, or a combination thereof. For example, the offset can be utilized based on the historical times to connection to alter a trajectory of a slew rate, a distance, the impeller speed, and/or the engine speed so that the actual time to connection's trajectory is likely to match that of the theoretical time to connection at some time. As another example, the filters are utilized to reduce any noise induced into the hybrid operating system 100 to enhance accuracy associated with calculations relative to the time to connection. However, it is understood that any variables associated with the hybrid operating system 100 and/or the general operation of the hybrid-electric vehicle.

In one or more embodiments, the derivative of the disconnect clutch-slip is determined as follows:

$$K0 \text{ Slip Derivative}_{rev/sec2} = dV(K0 \text{ Slip})/dt(K0 \text{ Slip})$$

As is discussed above, the theoretical time to connection is determined based on the K0 slip and the K0 slip derivative, which ultimately may determine the timing for when the disconnect clutch 114 is locked (e.g., engages the engine module 106).

At operation 210, a calculation associated with the actual time to connection is observed (e.g., by the PCM 102 and/or the HPCM 110). As an example, the actual time to connection can be observed by the operator of the hybrid-electric vehicle, via a user interface. As another example, the actual time to connection may be based on sensor data derived from any of the components associated with the hybrid operating system 100. In one or more embodiments, the actual time to connection is determined by calculating the quotient of an actual distance of the disconnect clutch-slip and the derivative of the disconnect clutch-slip, as follows:

$$K0 \text{ Time to Connection}_{sec} =$$

$$K0 \text{ Slip Distance}_{rev/sec}/K0 \text{ Slip Derivative}_{rev/sec2}$$

For example, a request for a step-out motor torque to initiate a torque control is sent (e.g., from the PCM 102 or the HPCM 110 to the P2 motor 112) based on the actual time to connection to compensate for a difference between the actual time to connection and the theoretical time to connection. More specifically, as an example, the request for the step-out motor torque to initiate the torque control can be sent based on whether the actual time to connection falls below a calibration time related to the theoretical time connection and/or a slip speed rate convergence. As another example, the request for the step-out motor torque to initiate the torque control can also be sent based on a communication delay (e.g., a delay in communication associated with the CAN bus 104) and/or a response delay (e.g., a delay in the engagement of the disconnect clutch 114). At operation 212, the calculation associated with the actual time to connection is further observed (e.g., by the PCM 102 and/or the HPCM 110). As an example, the actual time to connection can be observed by the operator of the hybrid-electric vehicle, via the user interface. As another example, the actual time to connection may be based on sensor data derived from the components associated with the hybrid operating system 100. For example, the engine module 106 is caused (by the PCM 102 or the HPCM 110) to transition to a torque control based on the initiation of the torque control at operation 210.

The disconnect clutch 114 is reported to be locked at operation 214. In one or more embodiments, the disconnect clutch 114 is locked based on the slip speed rate convergence and/or the actual time to connection being compensated so that the actual time to connection approached or reapproaches an acceptable range relative to the theoretical time to connection. It is understood that the acceptable range relative to the theoretical time to connection is based on respective hardware-related characteristics that can vary from vehicle to vehicle, for example. For example, the disconnect clutch 114 may transmit the report to the PCM 102 and/or the HPCM 110. At operation 216, the example method 200 ends based whether the hybrid-electric vehicle is turned off (e.g., key being removed from an ignition associated with the hybrid-electric vehicle or a push-to-start button being engaged by the operator of the hybrid-electric vehicle). In an instance wherein the hybrid-electric vehicle is turned off, the example method 200 is ended. However, in an instance wherein the hybrid-electric vehicle is not turned off, the example method 200 is processed again after a next event (e.g., at operation 218) associated with the locking of the disconnect clutch 114 occurs and beginning at least at operation 204 until the hybrid-electric vehicle is turned off.

In an instance wherein the request is not received (e.g., at operation 206), the example method 200 is processed again after the next event (e.g., at operation 218) associated with the locking of the disconnect clutch 114 occurs and beginning at least at operation 204 until the request is received (e.g., at operation 206)

Figure 3:
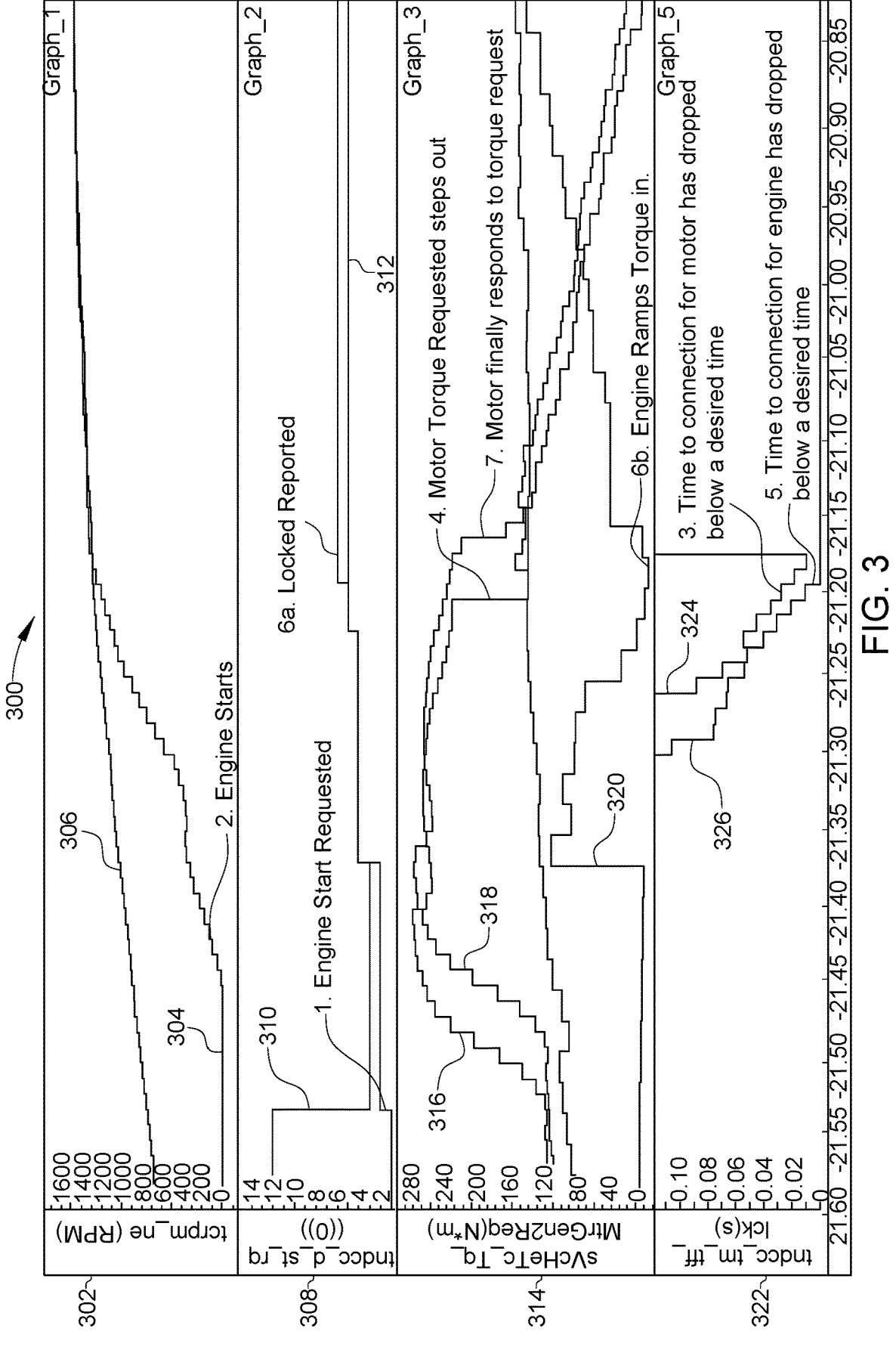
FIG. 3 illustrates a graph depicting varying operations of the operating system illustrated in FIG. 1 in accordance with the flowchart illustrated in FIG. 2 and in accordance with various implementations.

FIG. 3 depicts example graphical representations 300 of measured or observed operating characteristics that can be used during the performance of the operations 202-218. For example, the graphical representation 302 depicts the progression of the engine module's 104 actual time to connection (e.g., at line 304) as the engine module 104 approaches the acceptable range relative to the theoretical time to connection (e.g., at line 306). As another example, the graphical representation 308 depicts the request for the engine module 106 to start, or turn on, (e.g., at line 310) relative to the instance wherein the disconnect clutch 114 is reported to be locked (e.g., at line 312). As an additional example, the graphical representation 314 depicts the instance wherein the motor torque request steps out (e.g., at line 316), the instance wherein the P2 motor 112 responds to the torque request (e.g., at line 318), and the instance wherein the engine module 106 ramps torque therein (e.g., at line 320). As a further example, the graphical representation 322 depicts the instance wherein the actual time to connection associated with the engine module 106 has dropped below a defined time (e.g., at line 324) and an instance wherein the actual time to connection associated with the P2 motor 112 has dropped below a defined time (e.g., at line 326). As an example, the defined time associated with both of the actual time to connection associated with the engine module 106 and the actual time to connection associated with the P2 motor 112 are each device dependent. For example, the defined time associated with both of the actual time to connection associated with the engine module 106 and the actual time to connection associated with the P2 motor 112 can vary from vehicle to vehicle based on a particular model of the vehicle and/or the size and/or efficiency of the engine and/or motor associated with the particular vehicle.

As an example, each of the lines associated with each of the graphical representations depicted in FIG. 3 are representative of data and/or information utilized by one or more examples to perform the operations described herein. As another example, each of the lines associated with each of the graphical representations depicted in FIG. 3 can be displayed via the user interface to the operator of the hybrid-electric vehicle so that the operator may observe the progression of at least the example method 200 and/or manipulate operations described herein.

FIG. 4 is a flowchart illustrating an example method 400 for controlling a locking time of a disconnect clutch (e.g., the disconnect clutch 114) associated with a vehicle (e.g., the hybrid-electric vehicle), which in some examples provides optimized operation. For example, the vehicle may utilize a hybrid propulsion system (e.g., the hybrid operating system 100). However, it is understood that the vehicle may use any type of propulsion system. At operation 402 a predicted time associated with a completion of an engine-start is determined. For example, the determination of the predicted time is based on a request to initiate the engine-start. As another example, the determination of the predicted time can include a determination of a slip rate. As an additional example, the determination of the slip rate can be based on an impeller speed and an engine speed. As a further example, the determination of the predicted time can also be based on the impeller speed and a target engine speed. As yet another example, the determination of the predicted time is further based on dividing the slip rate by a derivative of the slip rate.

At operation 404, an engine (e.g., the engine module 106) is caused to transition into torque control. For example, the engine is caused to transition into torque control in response to a difference between a calibration-time period associated with the predicted time and a time-to-connection associated with an engine-start time period. At operation 406, the disconnect clutch is caused to lock. For example, the disconnect clutch is caused to lock in response to response to the calibration-time period being within a range of the time-to-connection associated with the engine-start time period. As an example, causing the disconnect clutch to lock is based on the calibration-time period being concurrent with the time-to-connection associated with the engine-start time period. At operation 408, a report that the disconnect clutch is locked is transmitted. For example, the report that the disconnect clutch is locked can be transmitted to a PCM (e.g., the PCM 102).

In an example embodiment, a step-out motor torque request is transmitted. For example, the transmission of the step-out motor torque request is based on the difference between the calibration-time period and the time-to-connection associated with the engine-start time period. As another example, the transmission of the step-out motor torque request is further based on one or more errors. As an additional example, the one or more errors can include the time-to-connection associated with the engine-start time period falling below the calibration-time period, a communication delay, a controller area network delay, a response delay, or a combination thereof.

In another example embodiment, the difference between the calibration-time period and the time-to-connection associated with the engine-start time period is determined. For example, the difference between the calibration-time period and the time-to-connection associated with the engine-start time period is determined based on the one or more errors. In yet another example embodiment, one or more condition-based variables are applied to the impeller speed and/or the engine speed. For example, the one or more condition-based variables are applied to the impeller speed and/or the engine speed based on one or more historic slip rates. As another example, the one or more condition-based variables include a filter variable, an offset variable, one or more input parameters, or a combination thereof.

Thus, one or more examples of the present disclosure provide a means for predicting a time to connection related to a disconnect clutch (e.g., the disconnect clutch 114) associated with a hybrid-electric vehicle. Additionally, the present disclosure also provides a means for accurately reporting the locking of the disconnect clutch to enhance communication within a hybrid operating system (e.g., the hybrid operating system 100) so that response delays may be mitigated.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method comprising:
determining a predicted time associated with a completion of an engine-start based on a request to initiate the engine-start;
causing an engine to transition into torque control in response to a difference between a calibration-time period associated with the predicted time and a time-to-connection associated with an engine-start time period;
causing a disconnect clutch to lock in response to the calibration-time period being within a range of the time-to-connection associated with the engine-start time period; and
transmitting a report that the disconnect clutch is locked.

2. The method of claim 1, further comprising:
transmitting a step-out motor torque request based on the difference between the calibration-time period and the time-to-connection associated with the engine-start time period, wherein the transmission of the step-out motor request is further based on one or more errors, wherein the one or more errors include the time-to-connection associated with the engine-start time period falling below the calibration-time period, a communication delay, a controller area network delay, a response delay, or a combination thereof.

3. The method of claim 1, wherein causing the disconnect clutch to lock is based on the calibration-time period being concurrent with the time-to-connection associated with the engine-start time period.

4. The method of claim 1, further comprising:
determining the difference between the calibration-time period and the time-to-connection associated with the engine-start time period based on one or more errors, wherein the one or more errors include the time-to-connection associated with the engine-start time period being outside of the calibration-time period, a communication delay, a controller area network delay, a response delay, or a combination thereof.

5. The method of claim 1, wherein determining the predicted time associated with the completion of the engine-start further comprises:
determining a slip rate based on an impeller speed and an engine speed; or
determining a slip rate based on an impeller speed and a target engine speed.

6. The method of claim 5, wherein the determination of the predicted time is further based on dividing the slip rate by a derivative of the slip rate.

7. The method of claim 5, further comprising:
applying one or more condition-based variables to the impeller speed or the engine speed based on one or more historic slip rates, wherein the one or more condition-based variables include a filter variable, an offset variable, one or more input parameters, or a combination thereof.

8. A system comprising:
a vehicle controller configured to:
determine a predicted time associated with a completion of an engine-start based on a request to initiate the engine-start;
cause an engine to transition into torque control in response to a difference between a calibration-time period associated with the predicted time and a time-to-connection associated with an engine-start time period;
cause a disconnect clutch to lock in response to the calibration-time period being within a range of the time-to-connection associated with the engine-start time period; and
transmit a report that the disconnect clutch is locked.

9. The system of claim 8, wherein the vehicle controller is further configured to:
transmit a step-out motor torque request based on the difference between the calibration-time period and the time-to-connection associated with the engine-start time period, wherein the transmission of the step-out motor request is further based on one or more errors, wherein the one or more errors include the time-to-connection associated with the engine-start time period falling below the calibration-time period, a communication delay, a controller area network delay, a response delay, or a combination thereof.

10. The system of claim 8, wherein causing the disconnect clutch to lock is based on the calibration-time period being concurrent with the time-to-connection associated with the engine-start time period.

11. The system of claim 8, wherein the vehicle controller is further configured to:
determine the difference between the calibration-time period and the time-to-connection associated with the engine-start time period based on one or more errors, wherein the one or more errors include the time-to-connection associated with the engine-start time period being outside of the calibration-time period, a communication delay, a controller area network delay, a response delay, or a combination thereof.

12. The system of claim 8, wherein the vehicle controller configured to determine the predicted time associated with the completion of the engine-start is further configured to:
determine a slip rate based on an impeller speed and an engine speed; or
determine a slip rate based on an impeller speed and a target engine speed.

13. The system of claim 12, wherein the determination of the predicted time is further based on dividing the slip rate by a derivative of the slip rate.

14. The system of claim 12, wherein the vehicle controller is further configured to:
apply one or more condition-based variables to the impeller speed or the engine speed based on one or more historic slip rates, wherein the one or more condition-based variables include a filter variable, an offset variable, one or more input parameters, or a combination thereof.

15. One or more non-transitory computer-readable media storing processor-executable instructions that, when executed by at least one processor, cause the at least one processor to:

determine a predicted time associated with a completion of an engine-start based on a request to initiate the engine-start;

cause an engine to transition into torque control in response to a difference between a calibration-time period associated with the predicted time and a time-to-connection associated with an engine-start time period;

cause a disconnect clutch to lock in response to the calibration-time period being within a range of the time-to-connection associated with the engine-start time period, wherein causing the disconnect clutch to lock is based on the calibration-time period being concurrent with the time-to-connection associated with the engine-start time period; and transmit a report that the disconnect clutch is locked.

16. The one or more non-transitory computer-readable media of claim 15, wherein the at least one processor is further caused to:

transmit a step-out motor torque request based on the difference between the calibration-time period and the time-to-connection associated with the engine-start time period, wherein the transmission of the step-out motor request is further based on one or more errors, wherein the one or more errors include the time-to-connection associated with the engine-start time period falling below the calibration-time period, a communication delay, a controller area network delay, a response delay, or a combination thereof.

17. The one or more non-transitory computer-readable media of claim 15, wherein the at least one processor is further caused to:

determine the difference between the calibration-time period and the time-to-connection associated with the engine-start time period based on one or more errors, wherein the one or more errors include the time-to-connection associated with the engine-start time period being outside of the calibration-time period, a communication delay, a controller area network delay, a response delay, or a combination thereof.

18. The one or more non-transitory computer-readable media of claim 15, wherein the at least one processor is further caused to:

determine a slip rate based on an impeller speed and an engine speed; or determine a slip rate based on an impeller speed and a target engine speed.

19. The one or more non-transitory computer-readable media of claim 18, wherein the determination of the predicted time is further based on dividing the slip rate by a derivative of the slip rate.

20. The one or more non-transitory computer-readable media of claim 18, wherein the at least one processor is further caused to:

apply one or more condition-based variables to the impeller speed or the engine speed based on one or more historic slip rates, wherein the one or more condition-based variables include a filter variable, an offset variable, one or more input parameters, or a combination thereof.

* * * * *